Sept. 2, 1952    W. T. BUHL    2,608,868
GYRO VERTICAL
Filed March 29, 1946
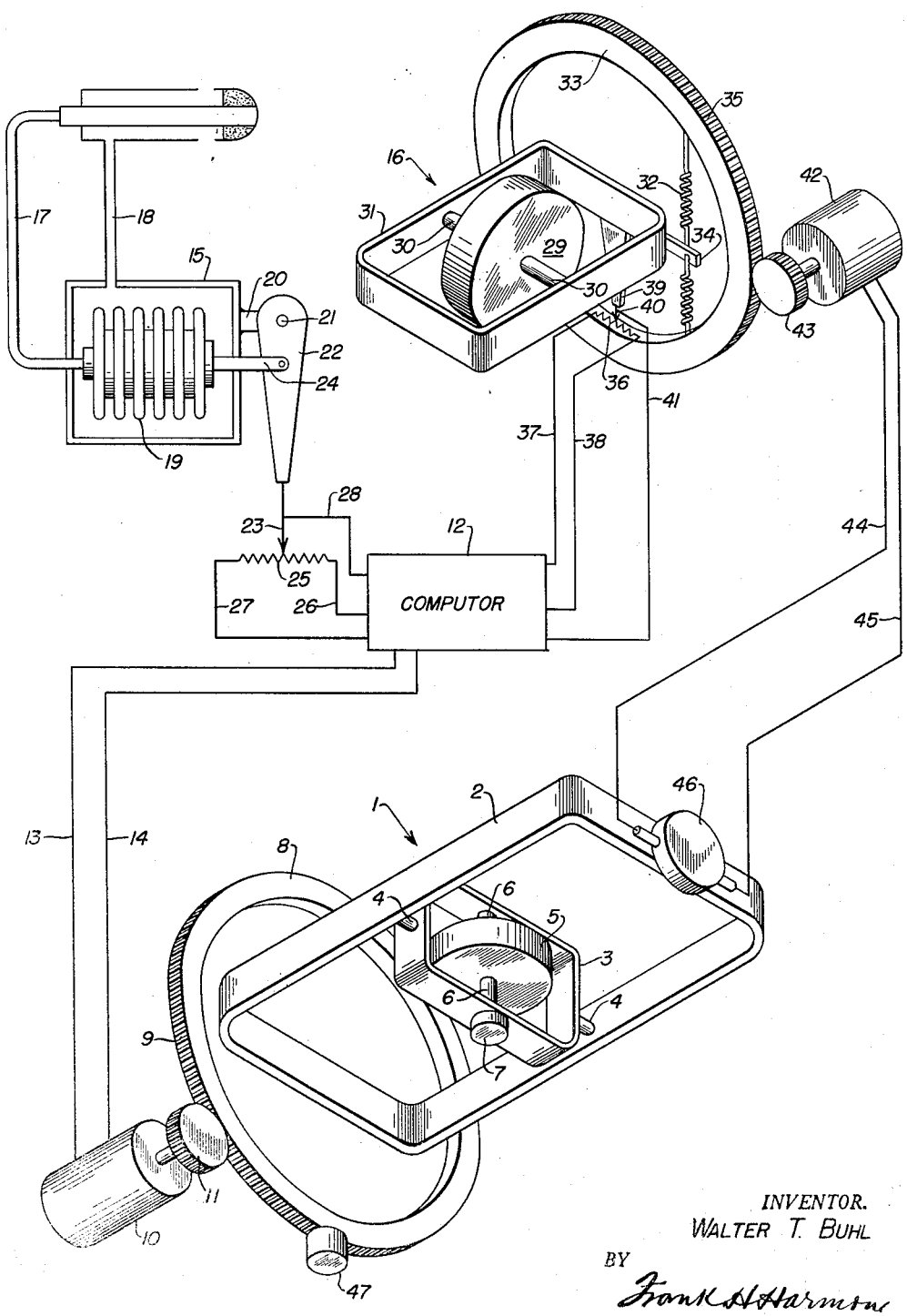
INVENTOR.
WALTER T. BUHL
BY
Frank H. Harmon
ATTORNEY Patented Sept. 2, 1952

2,608,868

UNITED STATES PATENT OFFICE 2,608,868

GYRO VERTICAL

Walter T. Buhl, Shaker Heights, Ohio, assignor to Jack & Heintz Precision Industries, Inc., Cleveland, Ohio, a corporation of Delaware Application March 29, 1946, Serial No. 657,982

1 Claim. (Cl. 74—5.47)

This invention relates to gyro verticals from which an horizon indicator can be operated and has for one of its primary objects to provide an horizon reference which is free of turn error.

A more particular object is to provide a gyro vertical with an erecting system which is automatically positioned during turns of the aircraft in order to prevent centrifugal forces from acting on the erecting system to cause false horizon bar indications.

A further object is to provide in combination with a gyro vertical an airspeed indicator and a rate of turn gyro for controlling the position of the roll erecting means on the gyro vertical in order to eliminate the effect of centrifugal forces on the erecting means.

Conventional gyro verticals deviate from the true vertical because when the aircraft turns whether banked or flat, centrifugal force acts on the erecting means and causes the gyro to erect to an attitude such that the combination of centrifugal force and gravity no longer affect the erecting means. As a means of remedying such a situation it is proposed to measure the centrifugal force and apply a correction for it in the erecting mechanism so that although the erecting means is attempting to erect to the resultant force of gravity and centrifugal force, the erection is displaced at an angle whose tangent is proportional to centrifugal force. As a means for achieving this it is proposed to measure the air speed and put a signal proportional to the air speed into a computor. With this signal is mixed and multiplied in the computor the signal from a rate gyro. This multiplied signal, which is then transformed to correspond to the tangent of the angle required, is transmitted to a selsyn motor operating a phantom ring around the outer gimbal of the gyro vertical.

This phantom ring carries an erecting switch for roll. When the aircraft flies a banked turn, the phantom ring is moved by the motor to such a position that the combined resultant centrifugal force and gravity will act through the neutral axis of the erecting switch mounted on the phantom ring and cause no erection. Actually, the phantom ring follows the bank of the aircraft and the gyro vertical maintains a true vertical free of any turn error.

With the foregoing and other objects in view the invention resides in the combination of parts and details of construction set forth in the following specification and appended claims, certain embodiments thereof being shown in the accompanying drawing which is a schematic diagram showing the system, as a whole.

Referring more particularly to the drawing, there is shown a gyro vertical 1 having an outer gimbal 2, an inner gimbal 3 pivotally supported within gimbal 2 by pivots 4, and a rotor 5 pivotally mounted within the inner gimbal by pivots 6. Fixedly secured to gimbal 3 is a switch 7 which acts to control a suitable pitch erection means, not shown in the drawing.

A phantom ring 8 with gear teeth 9 is mounted with 360 degree freedom of movement about one end of the gimbal 2 by means of suitable bearings which are not shown in the drawing. As a part of the gyro vertical there is provided a suitable selsyn motor 10 which drives a pinion gear 11 engaging teeth 9 in phantom ring 8. The selsyn motor 10 receives its driving impulses from a suitable computor 12 by means of leads 13 and 14.

The computor 12 has for its controlling means an air speed indicator generally indicated at 15 and a rate of turn gyro generally indicated at 16. The air speed indicator 15 is provided with the usual Pitot tube 17, a static tube 18 and an expansible bellows 19. Pivotally connected to a bracket 20 on indicator 15 by means of a pin 21 is a lever 22 having a contact member 23. The lever 22 is moved by an arm 24 which is connected to lever 22 and bellows 19. The contact member 23 rides on a potentiometer pick-off 25 which is connected by leads 26 and 27 to computor 12. The contact member 23 is directly connected to the computor 12 by means of lead 28.

The rate of turn gyro 16 is shown having a rotor 29 carried by horizontal pivots 30 within a gimbal 31. The gyro 16 is constrained by a spring 32 which is connected at both ends to a phantom ring 33 and in the middle to gimbal 31 by a bracket 34. The phantom ring 33 is mounted on suitable bearings, not shown, about the gimbal 31. The ring 33 carries a potentiometer resistance pick-off 36. The pick-off 36 is connected by leads 37 and 38 to the computor 12. Secured to gimbal 31 at its pivot axis is an arm 39 carrying a contact member 40 that rides on resistance pick-off 36. The contact member 40 is directly connected to the computor 12 by means of a lead 41. A suitable selsyn motor 42 is associated with the rate of turn gyro 16 and has a pinion gear 43 engaging gear teeth 35 in phantom ring 33. The motor 42 is connected by leads 44 and 45 to an electrical pick-off 46 on the gyro vertical.

In operation the rate of turn gyro 16 will operate properly for the intended purpose when it has been constrained to operate in the plane of the outer gimbal 2 of the gyro vertical regardless of the attitude of the airplane. This is accomplished by having the pick-off 46 on the gimbal 2 of the gyro vertical and using it to operate the selsyn motor 42 to drive phantom ring 33 mounted about the gimbal 31 of the rate of turn gyro. The selsyn motor 42 is equipped with a suitable built-in follow-up system. Since the phantom ring 33 carries the pick-off 36 and the spring 32, a bank of the airplane does not cause incorrect rate of turn indications on the rate of turn gyro.

As the aircraft turns, whether banked or skidded, the invention provides for the elimination of the effect of centrifugal forces on the roll erecting switch of the gyro vertical and provides thereby a gyro vertical which is free of turn errors. This is accomplished by mixing and multiplying in computor 12 the impulses from the potentiometer pick-off 25, which are proportional to air speed, with the impulses from the potentiometer pick-off 36, which are controlled by the rate of turn gyro 16. This multiplied signal, which is then transformed to correspond to the tangent of the angle formed by the resultant force of gravity and centrifugal force acting on the erecting means, is transmitted to the selsyn motor 10. The motor 10 then moves the phantom ring 8 to such a position that the resultant of centrifugal force and gravity will act through the neutral axis of a suitable roll erecting switch 41 mounted on phantom ring 8 and thus cause no undesired roll erection. Actually the phantom ring 8 is made to follow the bank of the airplane and the gyro vertical rotor axis maintains a true vertical.

I claim:

A gyro vertical for use in aircraft comprising a rotor, inner and outer gimbals, a phantom ring adapted to move about the end of the outer gimbal ring, a pitch erecting switch secured to the inner gimbal, a roll erecting switch secured to said phantom ring and means associated with the gyro vertical for positioning the phantom ring and the roll erecting switch during turns of the aircraft.

WALTER T. BUHL.

REFERENCES CITED

The following references are of record in the file of this patent:

UNITED STATES PATENTS

| Number | Name | Date |
| --- | --- | --- |
| 2,188,606 | Koster | Jan. 30, 1940 |
| 2,242,806 | Wunsch | May 20, 1941 |
| 2,409,188 | Braddon et al. | Oct. 15, 1946 |
| 2,420,674 | Moore et al. | May 20, 1947 |